United States Patent
Bacher et al.

(10) Patent No.: US 6,408,239 B2
(45) Date of Patent: *Jun. 18, 2002

(54) PROCESS FOR CONTROLLING A CONTINUOUSLY VARIABLE TRANSMISSION SYSTEM (CVT)

(75) Inventors: Holger Bacher, Lindau; Dirk Clausen, Friedrichshafen, both of (DE)

(73) Assignee: ZF Friedrichshafen AG, Friedrichshafen (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,803

(22) PCT Filed: May 28, 1997

(86) PCT No.: PCT/EP97/02769

§ 371 (c)(1),
(2), (4) Date: Nov. 16, 1998

(87) PCT Pub. No.: WO97/46816

PCT Pub. Date: Dec. 11, 1997

(30) Foreign Application Priority Data

Jun. 1, 1996 (DE) .......................... 196 22 108

(51) Int. Cl.⁷ .............................................. G06F 17/00
(52) U.S. Cl. .............................. 701/67; 701/68; 477/37; 477/38; 477/40; 477/47; 474/18; 474/69
(58) Field of Search .............................. 701/67, 68, 51, 701/70, 71; 477/40, 49, 47, 48, 38, 45, 39; 192/221; 474/18, 28, 11, 17, 29, 12, 43, 41, 70; 475/67–68, 210, 127, 59

(56) References Cited

U.S. PATENT DOCUMENTS

| 4,843,918 A | * | 7/1989 | Morimoto | 477/38 |
|---|---|---|---|---|
| 4,909,103 A | * | 3/1990 | Morimoto | 477/38 |
| 4,947,971 A | * | 8/1990 | Tanaka | 477/97 |
| 5,009,127 A | * | 4/1991 | Morimoto et al. | 477/49 |
| 5,009,129 A | * | 4/1991 | Morimoto et al. | 477/49 |
| 5,012,910 A | | 5/1991 | Miyawaki | 192/4 A |
| 5,059,157 A | * | 10/1991 | Sato | 474/18 |
| 5,095,776 A | * | 3/1992 | Sato | 477/38 |
| 5,108,348 A | * | 4/1992 | Bornmann | 474/18 |
| 5,109,962 A | * | 5/1992 | Sato | 477/40 |
| 5,112,280 A | * | 5/1992 | Sato | 474/18 |

(List continued on next page.)

FOREIGN PATENT DOCUMENTS

| DE | 40 42 091 A1 | 7/1991 |
|---|---|---|
| DE | 40 42 092 A1 | 7/1991 |
| DE | 40 42 090 A1 | 11/1991 |
| DE | 43 01 591 A1 | 7/1993 |
| EP | 0 639 732 A1 | 2/1995 |
| GB | 2 239 912 A | 7/1991 |
| GB | 2 263 519 A | 7/1993 |

OTHER PUBLICATIONS

Japanese Patent Abstract, V. 17, No. 88, (M–1370) dated Feb. 22, 1993, (Toyota Motor Corp).
ATZ Autombilitechnische Zeitschrift 96 (1994), "Stufenloses Automatikgetrieb Ecotronic von ZF" by Von Manfred Boos and Wolf–Ekkehard Krieg, pp. 378–384.

Primary Examiner—Jacques H. Louis-Jacques
(74) Attorney, Agent, or Firm—Davis & Bujold, P.L.L.C.

(57) ABSTRACT

The proposal is for a process for controlling a CVT of the bevel-pulley-belt type in which, on the occurrence of a wheel-locking drive situation, a converter bridging clutch is disengaged and at the same time a forward or reverse drive clutch is disengaged. The pressure level of the secondary pulley (3) is hereby raised and the transmission ratio of the CVT is changed in accordance with a predeterminable transmission ratio change and a predeterminable gradient.

10 Claims, 7 Drawing Sheets

U.S. PATENT DOCUMENTS

| | | | | |
|---|---|---|---|---|
| 5,257,960 A | * | 11/1993 | Sato | 474/69 |
| 5,269,726 A | * | 12/1993 | Swanson et al. | 474/28 |
| 5,273,492 A | * | 12/1993 | Kashiwase et al. | 474/43 |
| 5,334,102 A | * | 8/1994 | Sato | 474/18 |
| 5,435,795 A | | 7/1995 | Mochizuki et al. | 477/39 |
| 5,607,373 A | * | 3/1997 | Ochiai et al. | 477/46 |
| 5,662,547 A | * | 9/1997 | Moroto et al. | 477/48 |
| 5,788,600 A | * | 8/1998 | Tsukamoto et al. | 475/45 |
| 5,853,347 A | * | 12/1998 | Aoki et al. | 477/45 |
| 5,871,416 A | * | 2/1999 | Sawada et al. | 477/47 |
| 5,890,987 A | * | 4/1999 | Lamers | 475/210 |
| 5,961,408 A | * | 10/1999 | König et al. | 474/18 |

* cited by examiner

PROCESS FOR CONTROLLING A CONTINUOUSLY VARIABLE TRANSMISSION SYSTEM (CVT)

The invention concerns a process for control of a CVT of the bevel-pulley-belt type during an ABS operation or during a lockup braking.

BACKGROUND OF THE INVENTION

Continuously variable automatic transmissions of the bevel-pulley-belt type, hereinafter referred to as CVT (continuously variable transmission), consist of the following units: a start-up unit, a forward/reverse drive unit, a variator, an intermediate shaft, a differential, and hydraulic and electronic control devices. Such a design has become known from the ATZ Automobiltechnische Zeitschrift 96 (1994) 6, page 380. In a vehicle equipped with a CVT there arise in the practice, during a lockup braking, the following problems: due to the rigid through drive of the CVT the lockup reduces the internal combustion engine to less than an idling speed, the so-called stall. As second effect belt slip can occur as result of the high speed gradients on the primary and secondary pulleys of the variator. In this connection DE-OS 40 42 092 has disclosed changing the ratio of a CVT to a new ratio value during the ABS operation, said new ratio value constituting a function of the ABS operation. DE-OS 40 42 090 has in turn disclosed a process for changing the actual ratio to a targeted ratio within a previuosly calculated time after the end of the ABS operation. The time here corresponds to a deceleration time from the actual speed of the vehicle to stoppage. It is known from EP-A1 0 639 732 to maintain the actual ratio during an emergency stop.

The prior art described regards only the variator as the active system for a braking operation. The prior art thus has the disadvantage that the connection between a vehicle wheel and an internal combustion engine, by a CVT, is not taken into account during a braking operation.

In view of that the invention is based on the problem of providing, for a braking operation, a process which takes into account the whole internal combustion engine/CVT system.

SUMMARY OF THE INVENTION

According to the invention the problem is solved by the fact that a wheel-locking drive situation is set when a control device for an antiblocking system indicates an active condition or the gradient of the wheel speeds is above a limit value and a brake is actuated or alternatively a brake pressure exceeds a limit value and the vehicle speed is higher than a limit value. With the setting of the wheel-locking drive situation a converter bridging clutch is opened, simultaneously a forward drive or reverse drive clutch is opened and the pressure level in the secondary pulley is raised, the ratio of the CVT then being changed by a predetermined differential value and the ratio being changed with a predetermined gradient. The solution offers the advantage that during locking braking the drive connection between output and input is severed. Hereby excessive stress of the power train is prevented and by an increase of the secondary pressure, belt slip is effectively prevented.

In a development of this it is proposed that the wheel-locking drive situation be reset when in a first scan it is positively detected that the brake has not been actuated or alternatively that the brake pressure is below a limit value and the wheel speed and the vehicle speed are lower than a limit value. In a second scan a forward or reverse drive position must be positively detected and a throttle valve signal must not exceed a limit value.

In case of a negative result on the second scan, it is to be tested whether the ratio is higher than a limit value. Here the ratio values above the limit value represent the range of comfortable start up and ratio values below the limit value represent the range of the down time adjustment. The second scan is negative, for example, when a drive position is introduced and the accelerator pedal has not been actuated.

In development of this, it is proposed that during an active drive condition of down time adjustment, at a first moment the secondary pressure be raised and the primary pressure reduced to minimum pressure. At a second moment the down time adjustment is terminated, the time interval between the first and second moments representing a function of the temperature of the hydraulic medium and of the ratio at the first moment. Alternatively to this, it is proposed that the down time adjustment be terminated when the secondary pressure shows a significant change. Another variant may consist of the down time adjustment being terminated when a start up ratio is detected by the axial position of the primary pulley.

DESCRIPTION OF THE PREFERRED EMBODIMENTS

Figure 1:
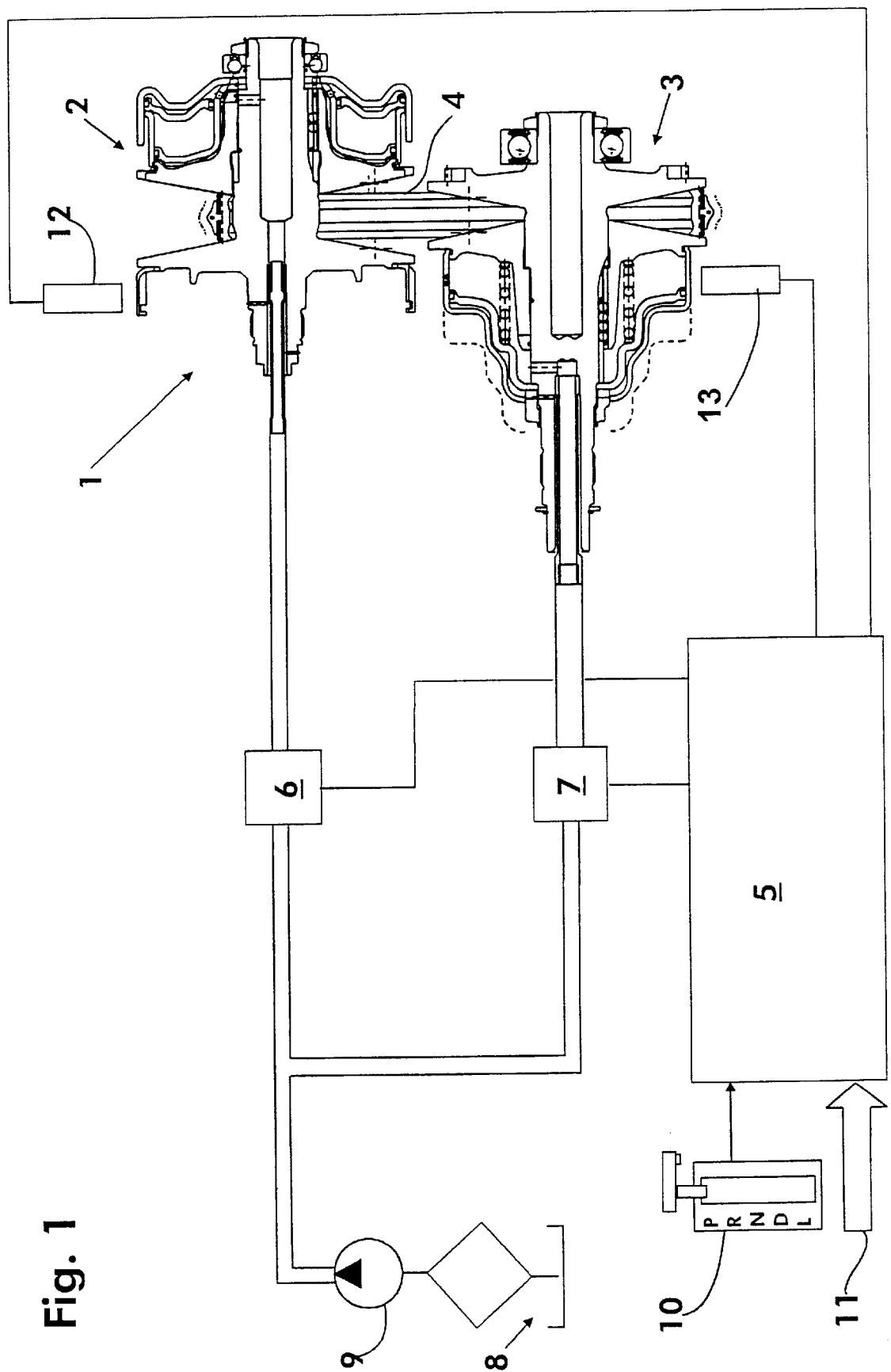
FIG. 1 is a system diagram.

FIG. 1 shows a reduced system diagram of a CVT. The entire system has been disclosed in the ATZ Automobiltechnische Zeitschrift 96 (1994) 6, page 380. Said article belongs to a laying open of this application. The reduced system diagram shows a variator with reference numeral 1. It comprises a primary bevel-pulley pair 2 situated on the input side, a belt organ 4 and a secondary bevel-pulley pair 3 situated on the output side. Each bevel-pulley pair consists of one bevel pulley stationary in axial direction and one movable in axial direction. The moving radius of the belt organ, and thus the ratio, are determined by the axial position of the movable bevel pulley. An electronic control device 5 receives from a selector lever 10 the signal, a speed signal of the primary pulley 12, a speed signal of the secondary pulley 13 and input variables 11. Input variables 11 are, for example the wheel speeds of an ABS control device (not shown), an active/non-active state signal of the ABS control device, the signal of a throttle valve, and the temperature of the hydraulic medium. The electronic transmission control device 5 determines from said input variables the function parameters of the CVT such as the ratio, the operation point and the pressure level in the primary and secondary pulleys. The electronic transmission control device 5 determines by means of the electromagnetic pressure regulator 6 the pressure level in the adjustment space of the primary bevel pulley pair 2 and via the pressure regulator 7 the pressure level in the adjustment space of the secondary bevel pulley pair 3. Here the pressure level of the primary pulley determines the input speed of the CVT such as the speed of the internal combustion engine. The pressure level of the secondary pulley determines the contact of the belt organ 4/secondary pulley pair 3, thus the capacity for torque transmission of the system. Pressure is supplied to the two pressure regulators 6 and 7 by a pump 9 which conveys the hydraulic medium from a lubricant sump 8 via a filter having no reference numeral.

Figure 2A:
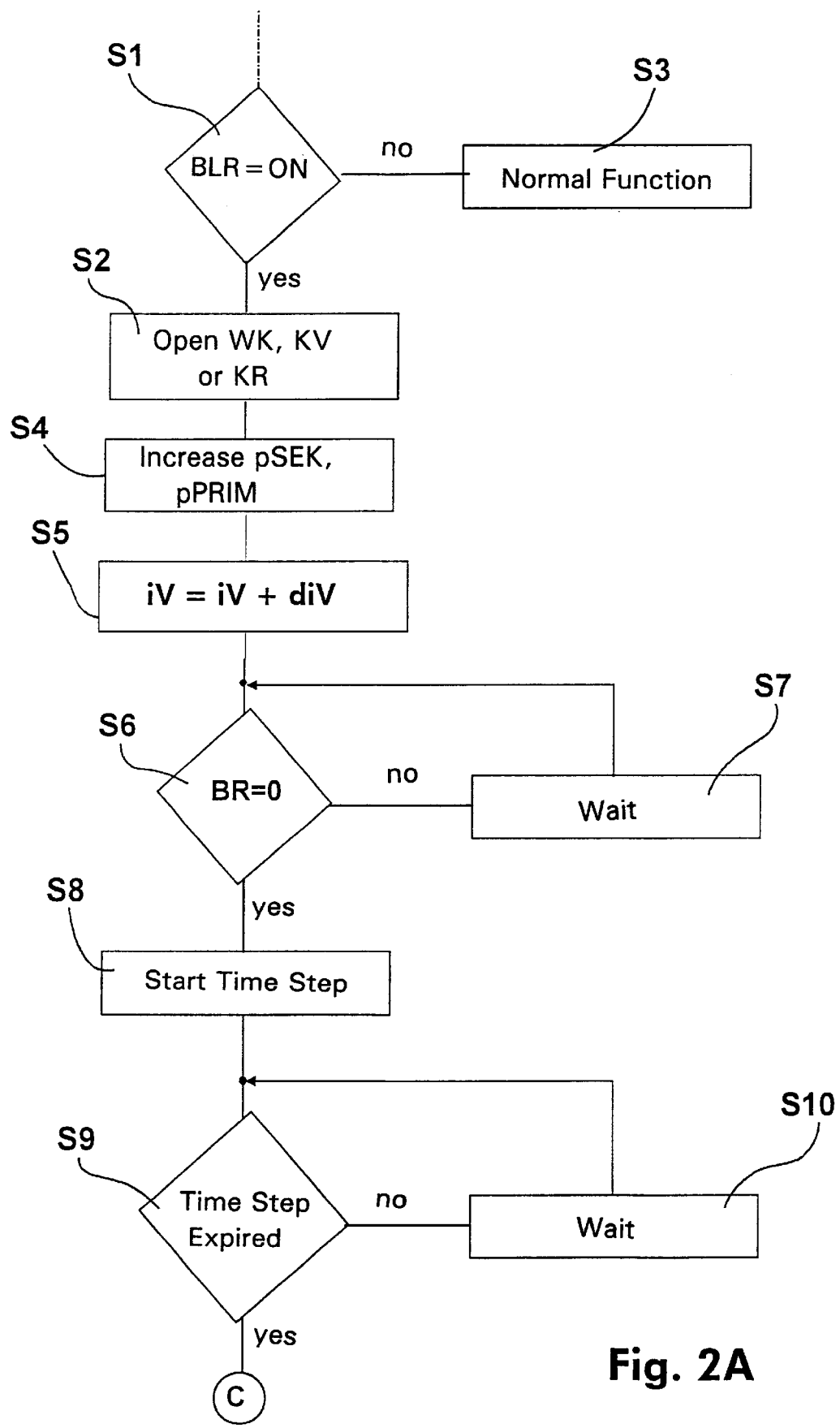
FIGS. 2A and 2B show a program flow wheel-locking drive situation.
Figure 2B:
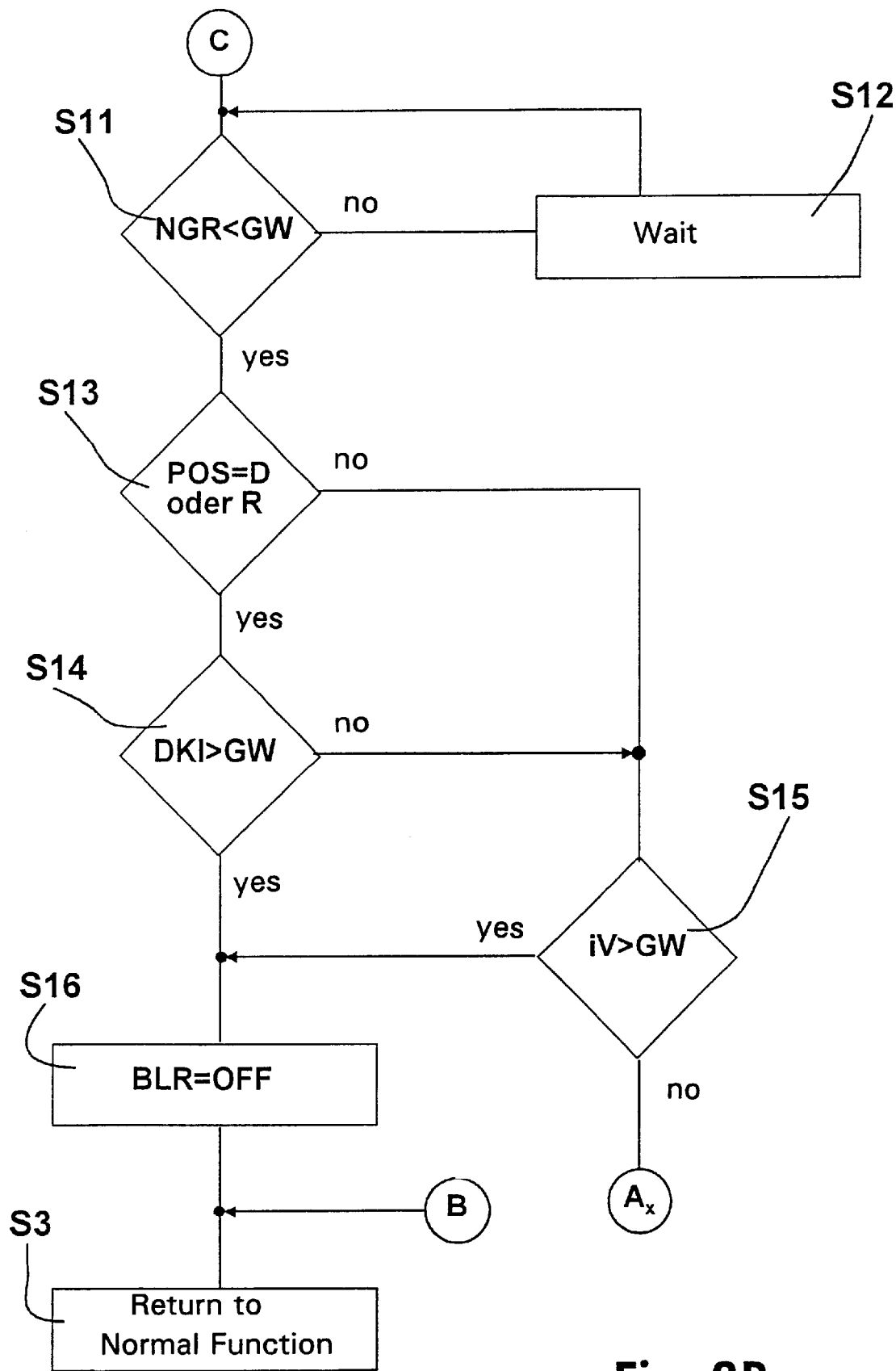

FIGS. 2A and 2B show a program flow for the wheel-locking drive situation. With step S1 tested is whether the wheel-locking drive situation has been set (BLR=ON). The drive situation is set when a control device for an antilock system indicates an active state or the gradient of the wheel speeds is above a limit value dnRad/dt<GW and a brake, BR=1 is actuated. The actuation of the brake can be detected, on one hand, by a mechanical contact of the brake light switch or alternatively by the height of the brake pressure pBR>GW. Another condition for setting for setting said drive situation is that the vehicle speed be higher than a limit value v>GW. If in step S1 it is detected that the wheel-locking drive situation has been set, BLR=ON, then in step S2, as reaction to this, a converter clutch (WK) and a forward drive clutch (KV) or reverse drive clutch (KR) are opened. It is obviously possible also to open only the converter bridging clutch (WK). If the wheel-locking drive situation has not been set, then with step S3 the normal function is returned to. In step S4 the primary (pPRIM) and secondary pressure (pSEK) are increased. As consequence of this in step S5, the ratio iV of the CVT changes by a predeterminable differential value diV. This applies iV=iV+ diV. The gradient of the change of ratio can be predetermined here. Thus, the ratio is actively changed during the wheel-locking drive situation by the electronic transmission control device 5 determined by the pressure level in the primary and secondary pulleys by means of both electromagnetic pressure regulators 6, 7. In step S6 is tested whether the brake is no longer actuated (BR=0). If the scan is negative, that is, the driver continues to actuate the brake, a holding pattern is run through with step S7. In case of a positive scan result, that is, the driver has released the accelerator pedal, a time step is started with step S8. In the step S9 test is whether the time step has expired. In the negative, another holding pattern is run through with step S10. If established that the time step has expired, then in the scan step S11 (FIG. 2B) it is tested whether the gradient of the wheel speeds is below a limit value NGR>GW. In the negative, with step S12 a holding pattern is in turn run through. If the wheel speed gradient NGR is below the limit value, then in step S13 is tested whether a forward (D) or reverse (R) drive position has been introduced by means of the selector lever 10. If this is not the case the program branches to step S15. In case of a positive scan result in step S13, in step S14 it is tested whether the throttle valve signal is above a limit value DKI>GW, that is, whether the driver has actuated the accelerator pedal. In case of a negative scan result, that is, the accelerator pedal has not, or almost has not been actuated, the program likewise branches to step S15. In case of a positive scan result, with step S16 the wheel-locking drive situation is reset (BLR=OFF). Thereafter follows step S3 with the return to normal function. In step S15 it is tested whether the last ratio iV is higher than a limit value iV>GW. If this is the case, there appears a-ratio with which a comfortable, reliable start up is possible, that is, the next step which follows is step S16 with the resetting of the wheel-locking drive situation (BLR=OFF). When the ratio iV is below a limit value, that is, direction overdrive, the program branches to the subprogram $A_x$. In the subprogram $A_x$, the drive situation down time adjustment is effected. The subprogram $A_x$ is explained with reference to FIGS. 3 to 5.

Figure 3:
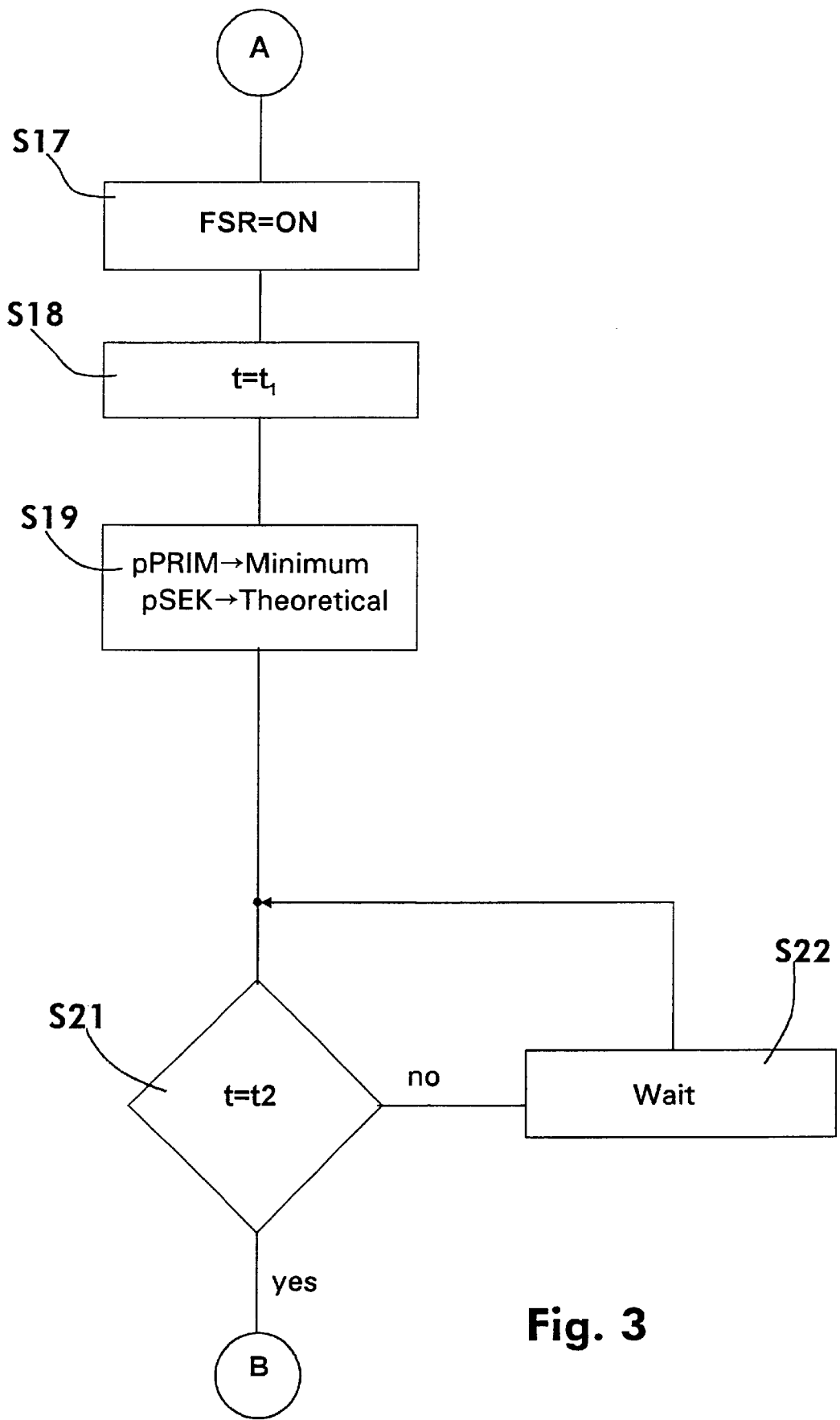
FIG. 3 is a program flow down time adjustment drive situation, first version.

FIG. 3 shows a first variant of the drive situation down time adjustment subprogram A. It begins with step S17 when the drive situation down time adjustment is set (FSR=ON). The drive situation down time adjustment is set when the ratio of the CVT is below a limit value, that is, direction overdrive. The subprogram is thus always active when the last ratio iV maintained is not enough for comfortable start up. In step S18, a time step is started In step S19 the primary pressure pPRIM is reduced to minimum pressure and the secondary pressure pSEK is raised to a theoretical value. Thereby the ratio is changed in direction to start-up ratio iV(A). In step S21 it is tested whether the time step has expired. If this is not the case, a holding pattern S22 is run through. The subprogram, according to FIG. 3, thus assumes that a start-up ratio iV(A) has been reached after expiration of a time step. Said time step, that is, the time interval from t1 to t2, here is a function of the temperature of the hydraulic medium (Teta) and of the last set ratio t1/t2=f(Teta, iV). After the time step has expired, the program branches to point B, that is, the program branches to the program flow according to FIG. 2B.

Figure 4:
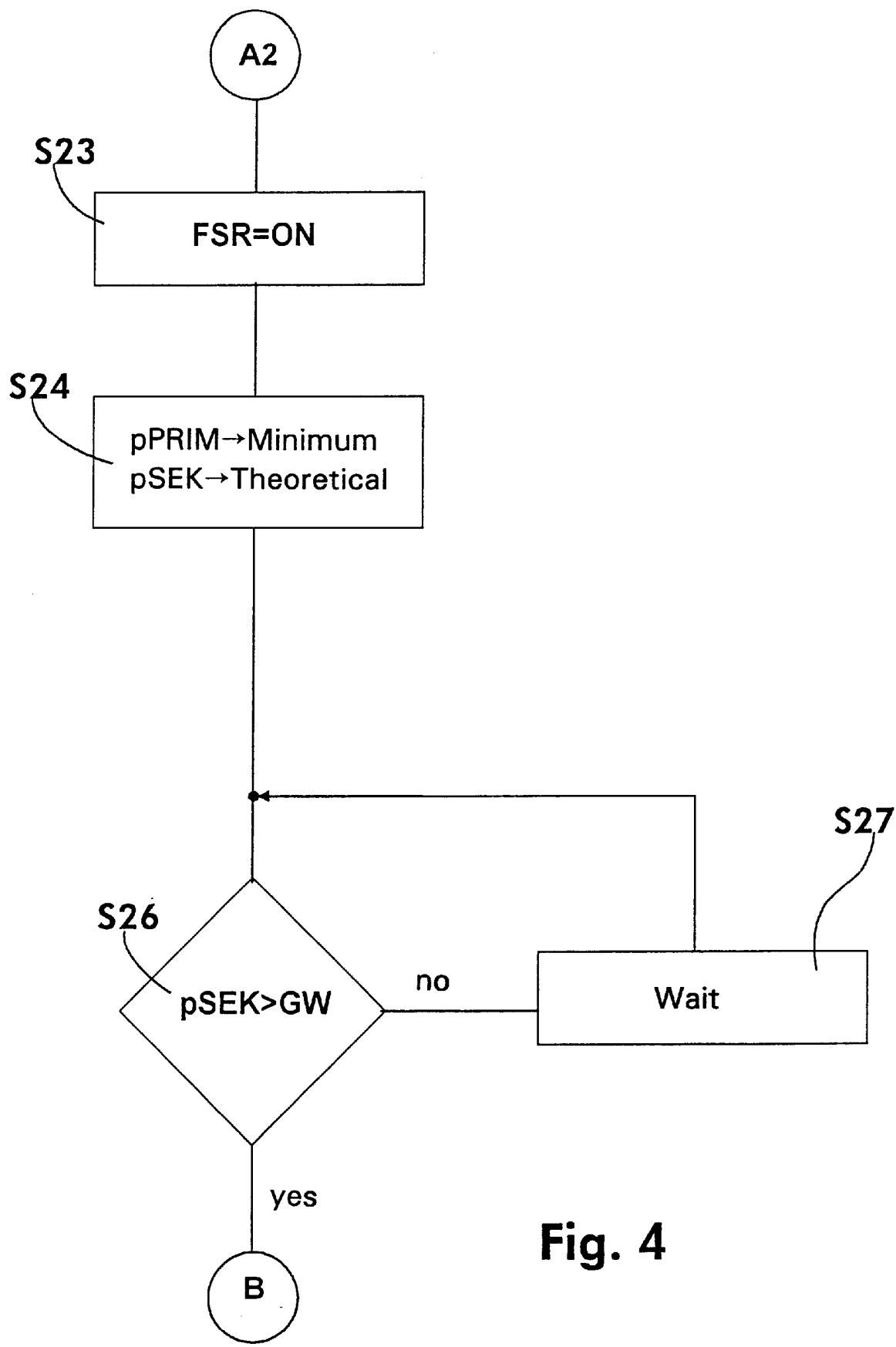
FIG. 4 is a program flow down time adjustment drive situation, second version.

FIG. 4 shows a second variant of the driving situation down time adjustment subprogram $A_2$. This begins with step S23 by setting the driving situation down time adjustment (FSR=ON). The input conditions are the same as explained in FIG. 3. In step S24 the primary pressure pPRIM is also reduced to a minimum and the secondary pressure pSEK is raised to a theoretical value. Thereby the ratio is passed to the start-up ratio iV(A). In step S26 tested is whether the secondary pressure has a significant change, that is, whether the secondary pressure is higher than a limit value pSEK>GW. If this is not the case, within step S27 the holding pattern is run through. If the scan is positive, that is, the secondary pressure shows a significant change, the program branches to the program point B, that is, return to the program flow according to FIG. 2B.

Figure 5:
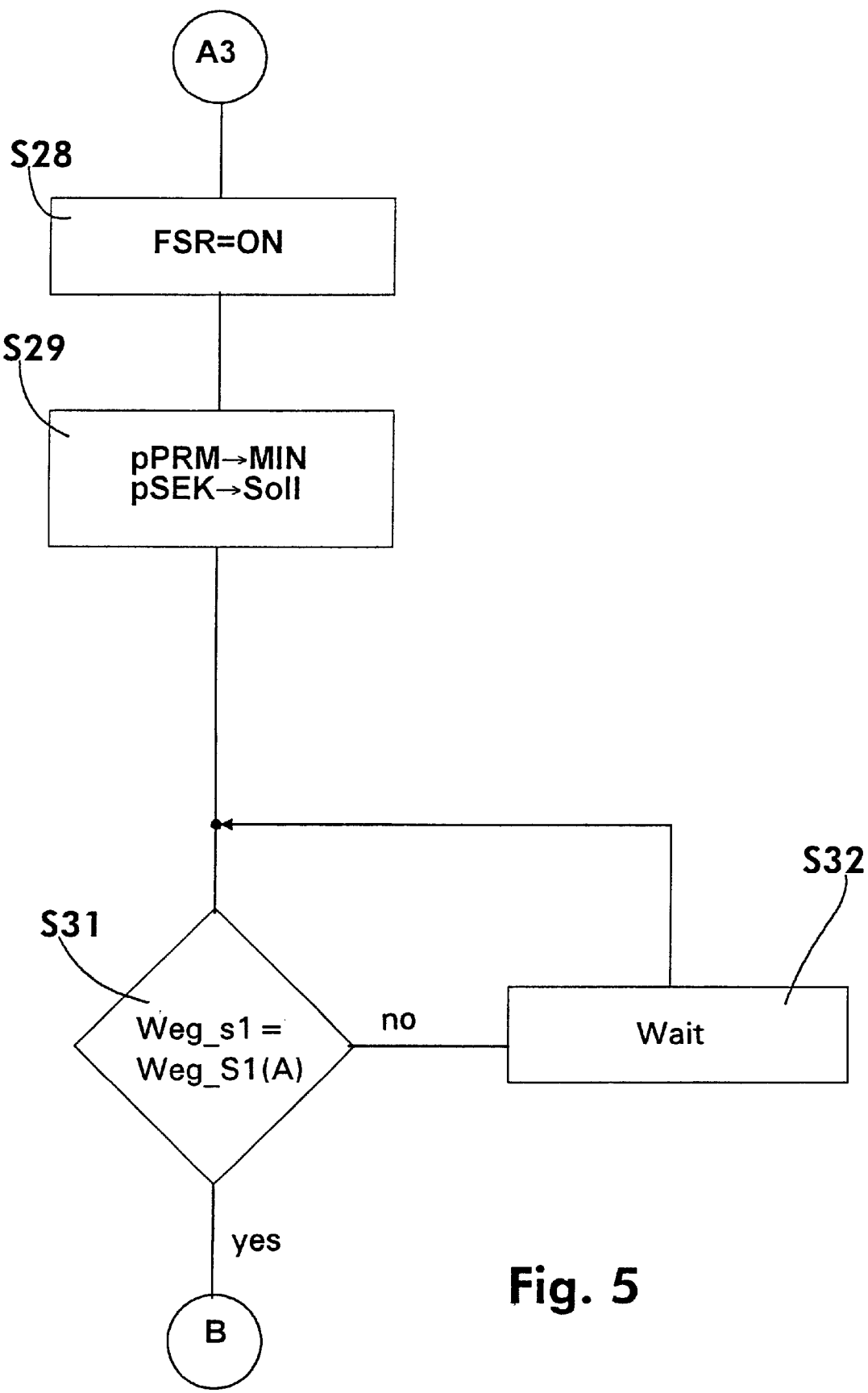
FIG. 5 is a program flow down time adjustment drive situation, third version.

FIG. 5 shows a third variant of the driving situation down time adjustment subprogram A3. Steps S28 and S29 correspond to steps S23 and S24 of FIG. 4. In step S31 tested is whether the axial position of the primary pulley S1 corresponds to the position of a start-up ratio iV(A), Web_S1(A). If this is not the case, a holding pattern is run through in step S32. In case of positive scan, that is, the ratio corresponds to the ratio for start-up, the program branches to point b of FIG. 2B.

Figure 6:
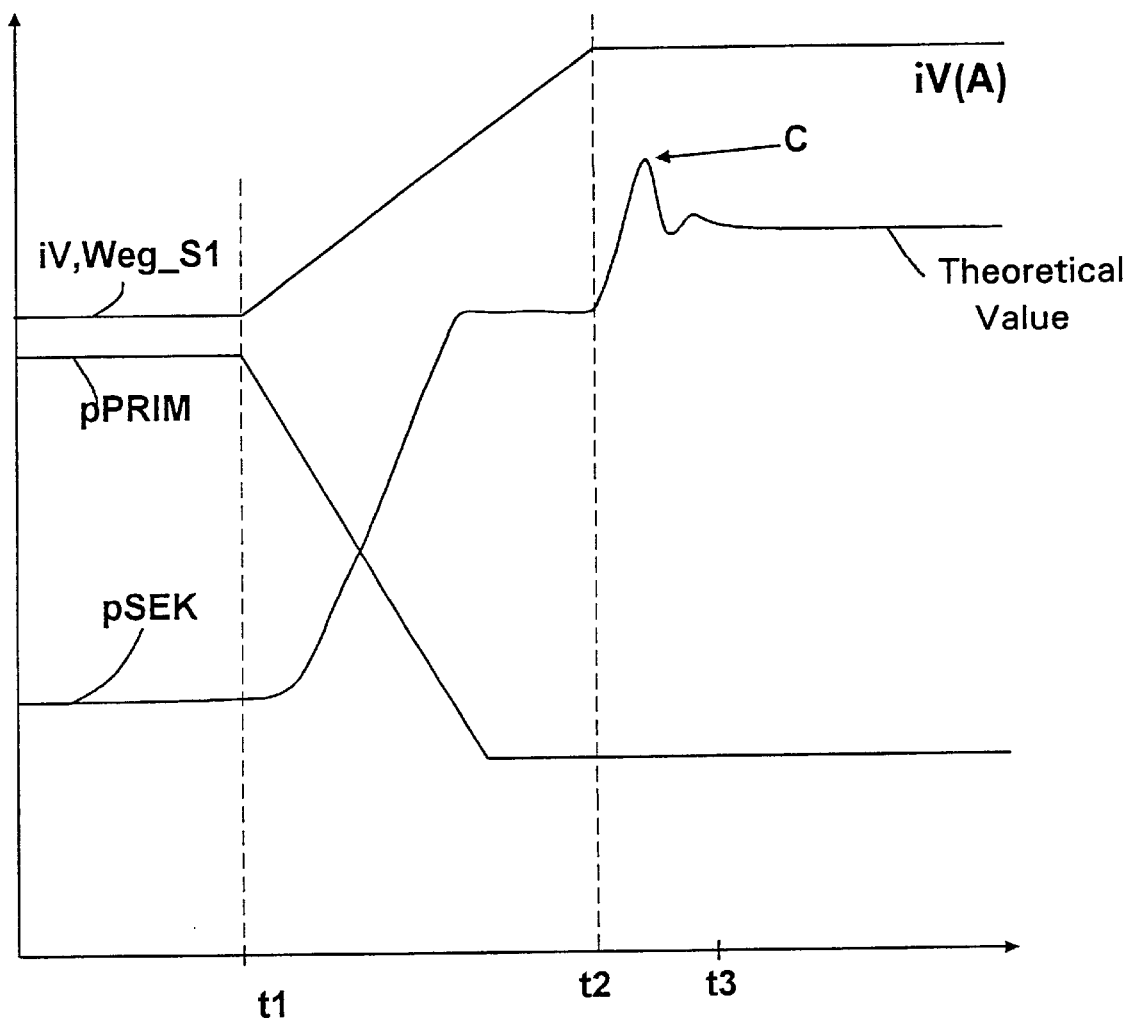
FIG. 6 is a time diagram of the pressure flow of the pulling pairs and the ratio or the path of the primary pulley during the drive situation down time adjustment.

FIG. 6 shows over time the pressure flow of the secondary pulley pSEK and the pressure flow of the primary pulley pPRIM and the ratio iV or the path of the primary pulley Weg_S1 during the drive situation down time adjustment. With the setting of the driving situation down time adjustment at a first moment t1, the secondary pressure is raised to a theoretical value. The primary pressure is simultaneously reduced to minimum pressure. At a second moment t2 the down time adjustment terminates. The time interval t1/t2 here is a function of the temperature of the hydraulic medium and of the ratio iV at the t1 moment. A second variant now consists in that the driving situation down time adjustment terminates when a significant change of the secondary pressure pSEK occurs. Said significant change is shown in FIG. 6 as pressure peak with the reference C. A third variant for the end of the driving situation down time adjustment now consists in that by the axial position of the primary pulley the start-up ratio iV(A) is detected, Weg_S1(A). This is usually carried out by situating on the cylinder of the primary pulley adequate prints so that the speed sensor establishes from the temporary offset of the pulses in relation to a reference mark the axial position of the primary pulley. In FIG. 6 the primary pulley S1 has reached the path Weg_S1(A) at the t2 moment.

The above described process compensates using a mathematical pattern, for non-linearity and interference levels of the variator 1, and calculating the pressure level of the primary pulley (pPRIM) according to the following equation:

$$pPRIM = [C - d(i)\,(di\_soll/dt)]A1 \text{ with}$$

$$C = (pSEK + K\_R2 n2^2) A2 \mu - K\_R1 n1^2 \cdot A1$$

wherein:
- pSEK: is a pressure level of the secondary pulley;
- A2: is an active surface of the secondary pulley;
- A1: is an active surface of the primary pulley;
- $\mu$: is a power ratio of the primary to the secondary pulley (kp/ks);
- d(i): is a ratio-dependent parameter;
- n1: is a rotational speed of the primary pulley;
- n2: is a rotation speed of the secondary pulley;
- K_R1: is a rotatory pressure coefficient of the primary pulley; and
- K_R2: is a rotatory pressure coefficient of the secondary pulley.

| Reference numerals | |
|---|---|
| 1 | variator |
| 2 | primary bevel pulley pair |
| 3 | secondary bevel pulley pair |
| 4 | belt organ |
| 5 | electric transmission control |
| 6 | electromagnetic pressure regulator |
| 7 | electromagnetic pressure regulator |
| 8 | lubricant sump |
| 9 | pump |
| 10 | selector level |
| 11 | input variables |
| 12 | speed primary pulley |
| 13 | speed secondary pulley |

What is claimed is:

1. A process for controlling a continuously variable transmission system incorporated within a vehicle, the continuously variable transmission having a bevel-pulley belt transmission with a pressure-actuated primary pulley and a pressure-actuated secondary pulley, a transmission for providing both forward drive and a reverse drive to the primary pulley for driving wheels of the vehicle, a drive clutch for one of supplying and interrupting drive to the primary pulley, a torque converter bridging clutch for one of supplying and interrupting drive to the primary pulley, a brake for stopping rotation of wheels of the vehicle, an anti-lock system for preventing the wheels from locking during actuation of the brake, and an electronic transmission control device for controlling operation of the continuously variable transmission system, the process comprising the steps of:

setting a wheel-locking drive situation (BLR=ON), via said electronic transmission control device, when at least one of the following events is present:
  a control device for the anti-lock system indicating an active state;
  a gradient of a speed of the wheels exceeds a wheel limit value and the brake is actuated; and
  a pressure of the brake exceeds a first brake limit value and the vehicle speed is greater than a first speed limit value;
responding to the setting of the wheel-locking drive situation (BLR=ON) by completely severing drive, supplied via the engine by simultaneous disengagement of the pulley, via said electronic transmission control device, to change a ratio of the bevel-pulley-belt transmission to a predeterminable differential value with the ratio being changed at a predeterminable gradient.

2. The process according to claim 1, wherein the step of setting a wheel-locking drive situation (BLR=ON) further comprises the step of resetting the wheel-locking drive situation (BLR=OFF) when:
said electronic transmission control device positively detects, via a first scan, at least one of the following events is present:
  the brake becomes disengaged;
  the brake pressure is below a second brake limit value; and
  a rotational speed of the wheels of the vehicle is below a second speed limit value; and
said electronic transmission control device positively detects, via a second scan, at least one of the following events is present:
  one of a forward (D) and a reverse (R) drive is introduced; and
  a throttle valve signal exceeds a throttle limit value.

3. The process according to claim 2, further comprises the step of, when the second scan has a negative result, testing whether a ratio (iV) is higher than a ratio limit value whereby values of the ratio above the ratio limit value representing comfortable start up and values of the ratio below the ratio limit value representing a range of down time adjustment (FSR).

4. The process according to claim 3, further comprises the step of, at a first moment (t1) during an active down time adjustment (FSR=ON), raising the secondary pressure (pSEK) and decreasing the primary pressure (pPRIM) to a minimum pressure, and
terminating the down time adjustment (FSR=OFF) when a start up ratio is detected via an axial position of the primary pulley.

5. The process according to claim 1, further comprises the step of calculating the pressure level in the primary pulley (pPRIM) and the secondary pulley, via a mathematical pattern and set by electromagnetic pressure regulators, to change the ratio.

6. The process according to claim 5, further comprises the step of calculating the pressure level of the primary pulley pPRIM according to the following equation:

$$pPRIM = [C - d(i)\,(di\_soll/dt)]A1 \text{ with}$$

$$C = (pSEK + K\_R2 n2^2) A2 \mu - K\_R1 n1^2 \cdot A1$$

wherein:
- pSEK: is a pressure level of the secondary pulley;
- A2: is an active surface of the secondary pulley;

A1: is an active surface of the primary pulley;

$\mu$: is a power ratio of the primary to the secondary pulley (kp/ks);

d(i): is a ratio-dependent parameter;

n1: is a rotational speed of the primary pulley;

n2: is a rotation speed of the secondary pulley;

K_R1: is a rotatory pressure coefficient of the primary pulley; and

K_R2: is a rotatory pressure coefficient of the secondary pulley; to facilitate for compensation of non-linearity and interference levels of the variator (1).

7. The process according to claim 1, further comprising the steps of:
   controlling the pressure level of the primary pulley to determine an input speed of the CVT; and
   controlling the pressure level of the secondary pulley to determine a contact pressure of a belt organ.

8. The process according to claim 1, further comprising the step of, in response to the setting of the wheel-locking drive situation (BLR=ON), increasing the pressure level for both the primary pulley and the secondary pulley.

9. A process for controlling a continuously variable transmission system incorporated within a vehicle, the continuously variable transmission having a bevel-pulley belt transmission with a pressure-actuated primary pulley and a pressure-actuated secondary pulley, a transmission for providing both forward drive and a reverse drive to the primary pulley for driving wheels of the vehicle, an associated drive clutch for one of supplying and interrupting drive to the primary pulley, a converter bridging clutch for one of supplying and interrupting drive to the primary pulley, a brake for stopping rotation of wheels of the vehicle, an anti-lock system for preventing the wheels from locking during actuation of the brake, and an electronic transmission control device for controlling operation of the continuously variable transmission system, the process comprising the steps of:
   setting a wheel-locking drive situation (BLR=ON), via said electronic transmission control device, when at least one of the following events is present:
      a control device for the anti-lock system indicating an active state,
      a gradient of a speed of the wheels exceeds a wheel limit value and the brake is actuated; and
      a pressure of the brake exceeds a first brake limit value and the vehicle speed is greater than a first speed limit value;
   responding to the setting of the wheel-locking drive situation (BLR=ON) by disengaging the converter bridging clutch simultaneously with disengagement of the drive clutch, and increasing a pressure level in the secondary pulley, via said electronic transmission control device, to change a ratio of the bevel-pulley-belt transmission to a predeterminable differential value with the ratio being changed at a predeterminable gradient;
   resetting the wheel-locking drive situation (BLR=OFF) when:
      said electronic transmission control device positively detects, via a first scan, at least one of the following events is present:
         the brake becomes disengaged;
         the brake pressure is below a second brake limit value; and
         a rotational speed of the wheels of the vehicle is below a second speed limit value; and said electronic transmission control device positively detects, via a second scan, at least one of the following events is present:
      one of a forward (D) and a reverse (R) drive is introduced; and
      a throttle valve signal exceeds a throttle limit value;
   testing whether a ratio (iV) is higher than a limit value, when the second scan has a negative result, whereby values of the ratio above the limit value representing comfortable start up and values of the ratio below the limit value representing a range of down time adjustment (FSR); and
   during an active down time adjustment (FSR=ON) at a first moment (t1), raising a secondary pressure (pSEK) and reducing a primary pressure (pPRIM) to a minimum pressure, and, at a second moment (t2), terminating the down time adjustment (FSR=OFF), whereby a time interval (t1/t2) is a function of a temperature of a hydraulic medium and of a ratio at the first moment (t1).

10. A process for controlling a continuously variable transmission system incorporated within a vehicle, the continuously variable transmission having a bevel-pulley belt transmission with a pressure-actuated primary pulley and a pressure-actuated secondary pulley, a transmission for providing both forward drive and a reverse drive to the primary pulley for driving wheels of the vehicle, an associated drive clutch for one of supplying and interrupting drive to the primary pulley, a converter bridging clutch for one of supplying and interrupting drive to the primary pulley, a brake for stopping rotation of wheels of the vehicle, an anti-lock system for preventing the wheels from locking during actuation of the brake, and an electronic transmission control device for controlling operation of the continuously variable transmission system, the process comprising the steps of:
   setting a wheel-locking drive situation (BLR=ON), via said electronic transmission control device, when at least one of the following events is present:
      a control device for the anti-lock system indicating an active state,
      a gradient of a speed of the wheels exceeds a wheel limit value and the brake is actuated; and
      a pressure of the brake exceeds a first brake limit value and the vehicle speed is greater than a first speed limit value;
   responding to the setting of the wheel-locking drive situation (BLR=ON) by disengaging the converter bridging clutch simultaneously with disengagement of the drive clutch, and increasing a pressure level in the secondary pulley, via said electronic transmission con trol device, to change a ratio of the bevel-pulley-belt transmission to a predeterminable differential value with the ratio being changed at a predeterminable gradient;
   resetting the wheel-locking drive situation (BLR=OFF) when:
      said electronic transmission control device positively detects, via a first scan, at least one of the following events is present:
         the brake becomes disengaged;
         the brake pressure is below a second brake limit value; and
         a rotational speed of the wheels of the vehicle is below a second speed limit value; and said electronic transmission control device positively detects, via a second scan, at least one of the following events is present:
  one of a forward (D) and a reverse (R) drive is introduced; and
  a throttle valve signal exceeds a throttle limit value;
testing whether a ratio (iV) is higher than a limit value, when the second scan has a negative result, whereby values of the ratio above the limit value representing comfortable start up and values of the ratio below the limit value representing a range of down time adjustment (FSR); and during an active down time adjustment (FSR=ON), at a first moment (t1), raising the secondary pressure (pSEK) and decreasing the primary pressure (pPRIM) to a minimum pressure, and terminating the down time adjustment (FSR=OFF) when the secondary pressure (pSEK) is higher than a limit value.

\* \* \* \* \*